United States Patent
Knestel

(12) 
(10) Patent No.: US 6,382,018 B2
(45) Date of Patent: *May 7, 2002

(54) MEASURING DEVICE FOR VEHICULAR DIAGNOSTICS

(75) Inventor: Anton Knestel, Hopferbach (DE)

(73) Assignee: MAHA Maschinenbau Haldenwang GmbH&Co.KG, Haldenwang (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,249

(22) Filed: Mar. 15, 1999

(30) Foreign Application Priority Data

Mar. 31, 1998 (DE) .......................... 198 14 357

(51) Int. Cl.⁷ ............................................. G01M 15/00
(52) U.S. Cl. ......................... 73/118.1; 340/467; 701/70
(58) Field of Search .................. 73/116, 117.2, 73/117.3, 118.1, 121, 129; 340/438, 441, 463, 466, 467; 701/70

(56) References Cited

U.S. PATENT DOCUMENTS

| | | | |
|---|---|---|---|
| 4,121,452 A | | 10/1978 | Wakabayashi et al. |
| 4,425,791 A | * | 1/1984 | Kling ........................ 73/117.3 |
| 4,622,548 A | * | 11/1986 | Andres et al. ................. 73/493 |
| 4,694,687 A | * | 9/1987 | Bonin et al. ................... 73/116 |
| 4,798,082 A | * | 1/1989 | Fujikawa et al. .......... 73/117.3 |
| 5,207,095 A | | 5/1993 | Teare et al. |
| 5,351,540 A | * | 10/1994 | Gee ............................. 73/146 |
| 5,369,581 A | | 11/1994 | Ohsuga et al. |
| 5,870,687 A | * | 2/1999 | Majstorovic ................ 73/117.3 |
| 5,935,191 A | * | 8/1999 | Sakanashi et al. ........ 73/504.03 |
| 5,956,664 A | * | 9/1999 | Bryan |
| 5,987,364 A | * | 11/1999 | Le Gusquet et al. |

FOREIGN PATENT DOCUMENTS

| | | | |
|---|---|---|---|
| EP | 433668 | 4/1994 | ............. G01L/5/28 |
| JP | 10260113 | 9/1998 | |
| WO | WO 98/31983 | 7/1998 | |

* cited by examiner

Primary Examiner—Eric S. McCall
(74) Attorney, Agent, or Firm—The Maxham Firm

(57) ABSTRACT

A universal battery operated measuring device for vehicular diagnostics, which offers a number of diagnostic options due to the universal use of various internal and external sensors and their link-up to one another. The measuring device has a housing top part and a housing bottom part. A keyboard and a display are provided on the housing top part. In addition, a slot is provided through which a strip of paper can be output, showing the measured parameters and results. In addition, a bubble level is provided so that the measuring device can be leveled.

30 Claims, 9 Drawing Sheets

ANGLE CALCULATION:

$$\varphi(t) = \int \omega \, dt$$

$$\varphi(t) = \frac{\sum_{i=0}^{t}(\omega_i - \omega_0)}{\text{CALIBRATION FACTOR FOR GYRO}}$$

$$\omega_0 = \frac{\sum_{i=0}^{E} \omega_i}{E}$$

DECELERATION CALCULATION:

$$a_{korr}(t) = \frac{a(t) - g * \sin \varphi(t)}{\cos \varphi(t)}$$

P-MOT(V)= P-RAD(V) - P-VER(V) =
ENGINE POWER(V)= WHEEL POWER(V) - POWER LOSS(V)

LOGARITHMIC DECREMENT $\Lambda = \ln(Xmax1/Xmax2)$

ATTENUATION FACTOR $\delta = \Lambda / T$

MEASURING DEVICE FOR VEHICULAR DIAGNOSTICS

BACKGROUND

1. Field of the Invention

This invention generally concerns a universal battery operated measuring device for vehicular diagnostics which offers a number of diagnostic options in particular due to the universal use of various internal and external sensors and their link-up to one another.

2. Discussion of Related Art

Chassis dynamometers, such as those described in European Patent 433,668, are often used to determine the minimum braking deceleration stipulated by law. However, this device can be used only with standard vehicles. Special vehicles are tested mainly by driving tests, however.

Use of traditional braking deceleration measuring devices with a spring-mass system has the disadvantage that they also measure acceleration due to gravity to some extent. This occurs due to the fact that the center of gravity of the vehicle body is above the point where the forces act (contact: tires with road surface). Therefore, the front shock absorbers of the vehicle are compressed in braking deceleration while at the same time the rear shock absorbers are elongated. As a result, the angle of the vehicle with respect to the road surface changes, that is, it pitches forward. This pitch angle $\phi$ produces a component attributable to acceleration due to gravity which has nothing to do with the actual deceleration of the vehicle. The acceleration due to gravity component is calculated from $g \cdot \sin(\phi)$.

On the other hand, this angle causes a reduced sensitivity to the actual acceleration, so the measured deceleration is calculated from the actual deceleration multiplied by $\cos(\phi)$.

In the past, a so-called gyro-stabilized platform has been used to overcome this problem for accurate measurements, and the measuring devices have been mounted on this platform. This platform holds the sensors in a horizontal position with respect to all pitching and rolling motions longitudinal and transverse of the vehicle body during the test run of the vehicle. Therefore, the errors described above do not occur. It is obvious that such a platform is an expensive device that is not easy to handle.

Another method is to "shoot" shots of color onto the ground at intervals by using a special device. For example, an ink cartridge may be ignited every second in such a device. An actual deceleration can be calculated on the basis of the distances measured manually after the braking test.

SUMMARY OF THE INVENTION

One object of this invention is to create a measuring device for motor vehicles that will permit an accurate and inexpensive method of detecting the deceleration and acceleration of a vehicle, determining engine power and evaluating shock absorbers.

According to this invention, the longitudinal and/or transverse acceleration which is subject to error is measured via a sensor, and the corresponding influences of acceleration due to gravity are corrected by means of a separate angle sensor, likewise separated according to longitudinal and transverse directions. To do so, an angle sensor may be mounted in the device in such a way that the sensitive direction corresponds to the pitch angle (for the longitudinal acceleration) or the pitching or rolling angle for transverse acceleration. The respective signals for the longitudinal and transverse acceleration can be compensated as illustrated in FIG. 5.

In tests in decelerating from a high speed with relatively low deceleration values, substantial braking distances and times are obtained in some cases. Since inexpensive angle sensors (not fully cardanic) indicate only a change in angle, this angle change must be integrated to obtain the angle $\phi$. Therefore, minor offset errors with the sensor can result in a considerable angle error after integration. Therefore, the offset error can be compensated according to this invention.

The braking test can be stored online in a memory in the device. After the measurement, a starting or stopping point (beginning/end) can be defined. Then the zero point of the angle sensor can be set so that the angle integral (all angles in the entire measurement time) is zero. In addition, with utility vehicles which have a tachograph, the path signal of the tachograph is entered via an amplifier input and processed. This path signal can be offset with the adjustment factor (k factor) of the tachograph. This calculation yields a standardized path signal (for example, one meter of distance traveled corresponds to eight pulses).

The distance can be converted by a first differentiation into a corresponding traveling speed. The acceleration signal can be obtained by differentiating the speed once again.

Furthermore, it is possible to obtain a standardized signal (for example, eight pulses per meter) for different types of tachographs. This eliminates the correction in the device as described above.

Due to the relatively high resolution of the path sensor, the time resolution of the acceleration is not particularly great, especially at low traveling speeds. Therefore, it is proposed according to this invention that the built-in acceleration sensor be adjusted with the tachograph signal at higher traveling speeds.

Thus, a corrected deceleration and acceleration signal can be obtained by means of the sensors present in the device and the methods described above. Velocity is obtained by integrating the acceleration signal thus derived.

In addition, engine power can be determined with the portable measuring device according to this invention. The vehicle mass can be input into the device for this purpose. Then the acceleration can be determined in a driving test, and the velocity can be obtained by integrating the acceleration. The tractive power of the vehicle can be calculated according to Newton's second law, $F=m \cdot a$, where an acceleration power P-Rad [wheel power]=$F \cdot v$ can be determined by multiplication by velocity.

After reaching the maximum engine rpm, the drive can be separated by a clutch. The driving resistances then brake the vehicle mass. Again, a deceleration force ($F=m \cdot a$) can be obtained from the deceleration occurring here multiplied by the vehicle mass, and a deceleration power (P-Ver [power loss]=$F \cdot v$) (or a so-called power loss) can be calculated by multiplying by the integrated deceleration (speed). Then the acceleration power and the deceleration power (or the power loss) can be added geometrically, yielding a total power or engine power. Since the engine is coupled during acceleration and is decoupled in deceleration, a mass component of the engine corresponding to a centrifugal mass is added to the vehicle mass during the acceleration phase to compensate for the absence of the centrifugal mass of the engine in the decoupled state. It should be pointed out that either the mass component for the acceleration phase or the mass component for the deceleration phase can be corrected. Thus, according to this invention, no rolling set with corresponding centrifugal masses are needed to determine the engine power.

In addition, the so-called pitching or rolling angles can also be measured by means of the built-in sensors according to this invention. In addition, the wheel base can also be input as additional data, for example, by a keyboard. If the vehicle is set in vibration, the damping can be calculated directly, and the measuring device need be located only on a flat surface in the passenger compartment.

In addition, it is possible to implement an evaluation of the shock absorbers directly during the braking test. The pitch of the vehicle is greater the greater the braking deceleration. Therefore, a quantity is calculated which is modified by the deceleration, that is, the pitch angle is measured per m/s² of deceleration. Thus, according to this invention the shock absorbers of a vehicle can be tested and evaluated without any great mechanical outlay.

BRIEF DESCRIPTION OF THE DRAWING

The objects, advantages, and features of the invention will be more readily perceived from the following detailed description, when read in conjunction with accompanying drawing, in which.

DETAILED DESCRIPTION OF THE PREFERRED EMBODIMENTS

Figure 1:
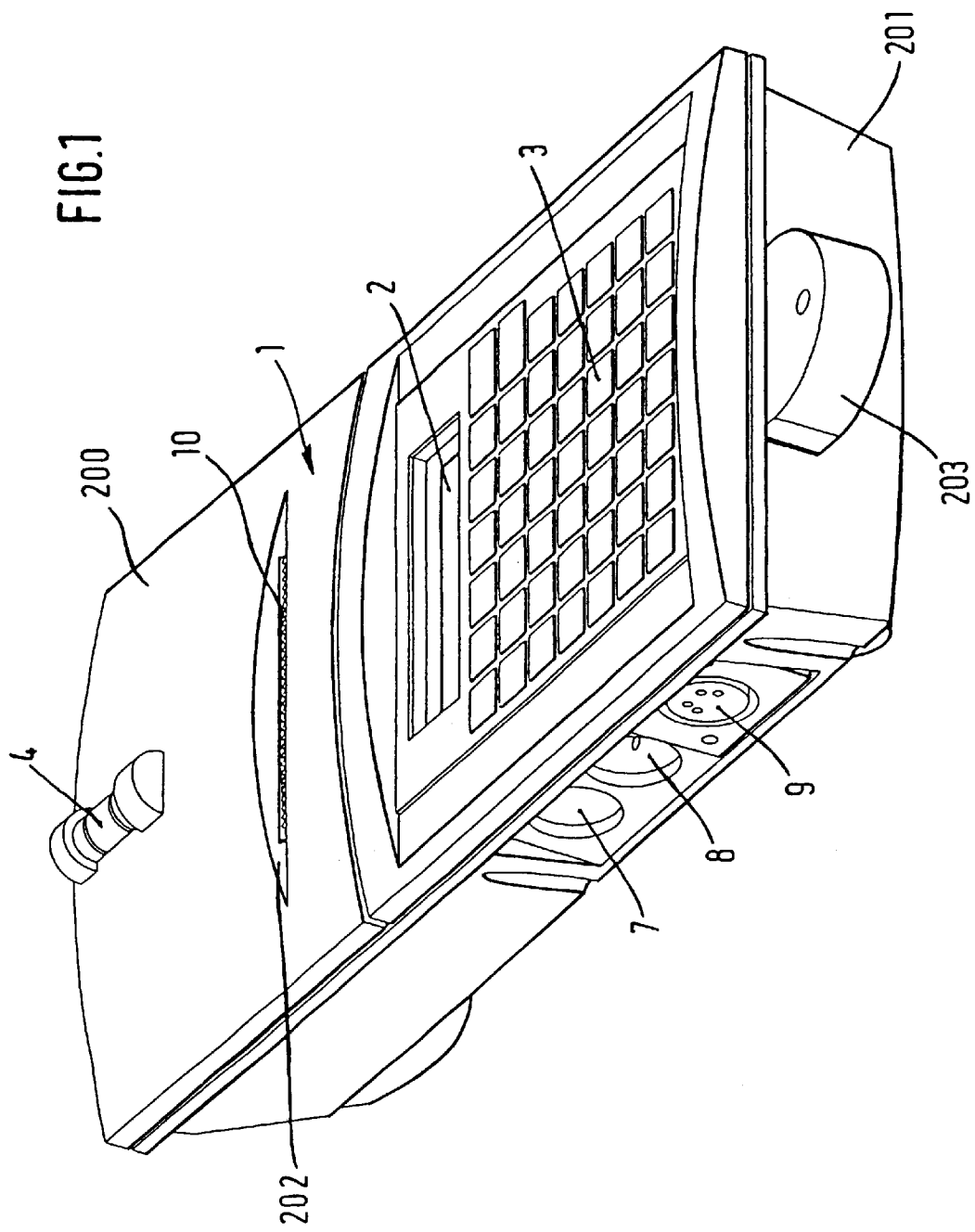
FIG. 1 is a perspective view of the measuring device of the invention.

FIG. 1 shows a measuring device in accordance with the invention with housing 1 having housing top part 200 and housing bottom part 201. Input keyboard 3 and display 2 are provided on the housing top part. In addition, top part 200 has a slot 202 through which paper strip 10 can be output. Parameters and results can be detailed and illustrated on the paper strip. Bubble level 4 is provided on the housing top part to permit leveling of the measuring device or housing 1. Receptacle 203 for stand base 5 (shown in FIG. 3) is provided on bottom part 201 of the housing. In addition, connections 7, 8 or 9 are also shown on the side of the measuring device; they serve to connect the measuring device to external instruments and sensors. Connection 7, for example, may be used to connect a pressure sensor (boiler pressure), a pedal force meter or a trailer hitch force sensor. Connection 8, for example, is for connecting a power supply unit or a battery charger, an external pushbutton for manually starting predetermined operations, a device for firing an ink cartridge or for controlling a valve between a trailer and a traction vehicle. In addition, an IrDA (infrared data association) interface or an RS 232 interface connection can be made at connection 8. In addition, connection 8 may also be used as an analog output (0–5 V). Connection 9, for example, may be used for connecting additional pressure sensors (front and rear axle), and a tachograph, among others.

Figure 2:
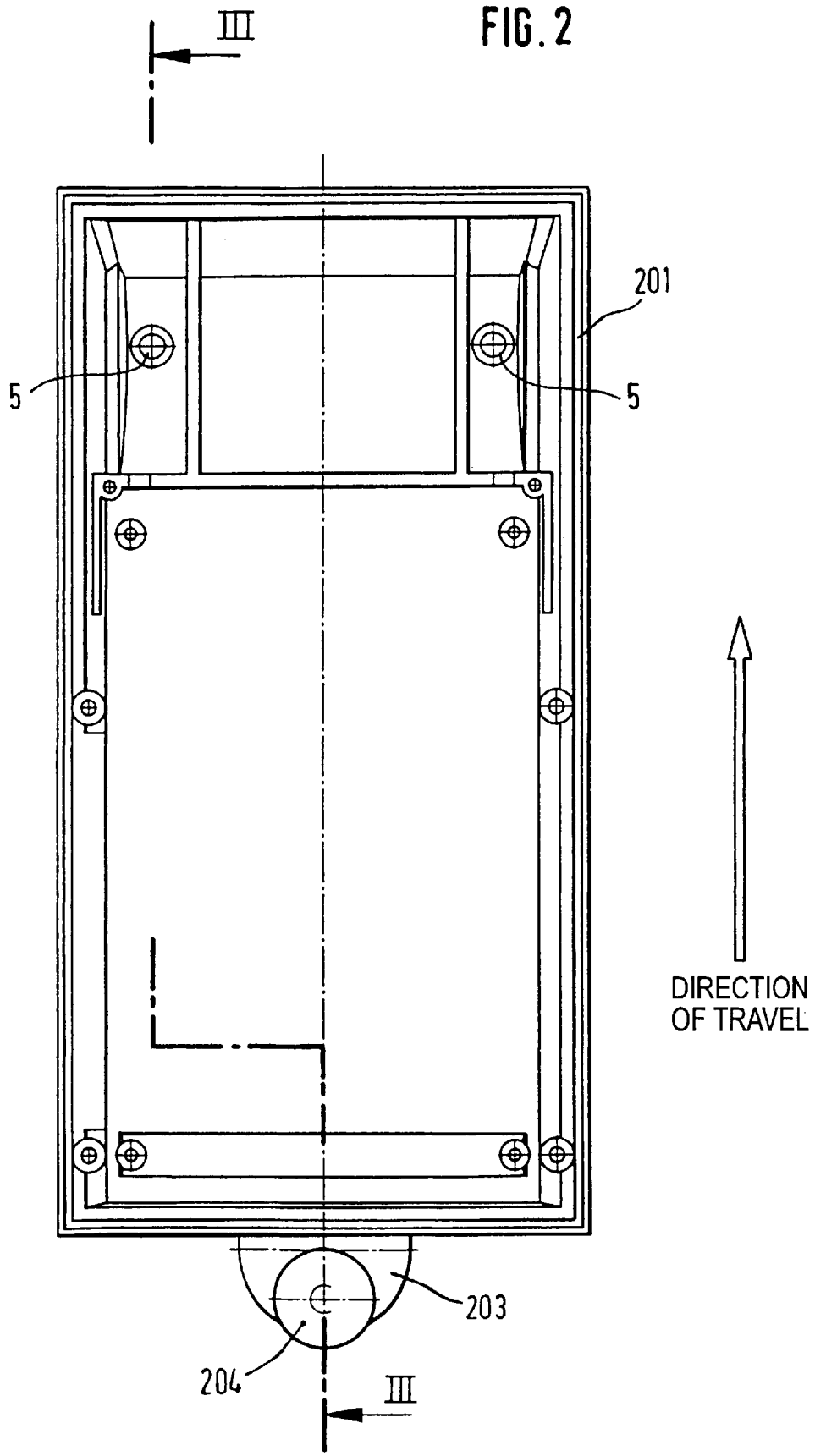
FIG. 2 is a plan view of the bottom part of the housing of the device in FIG. 1, as seen from above.

FIG. 2 shows a view of bottom part 201 of the housing as seen from above with the top part 200 removed (not shown). In addition, an adjusting screw 204 of the stand base 6 shown in FIG. 3 is also shown here.

Figure 3:
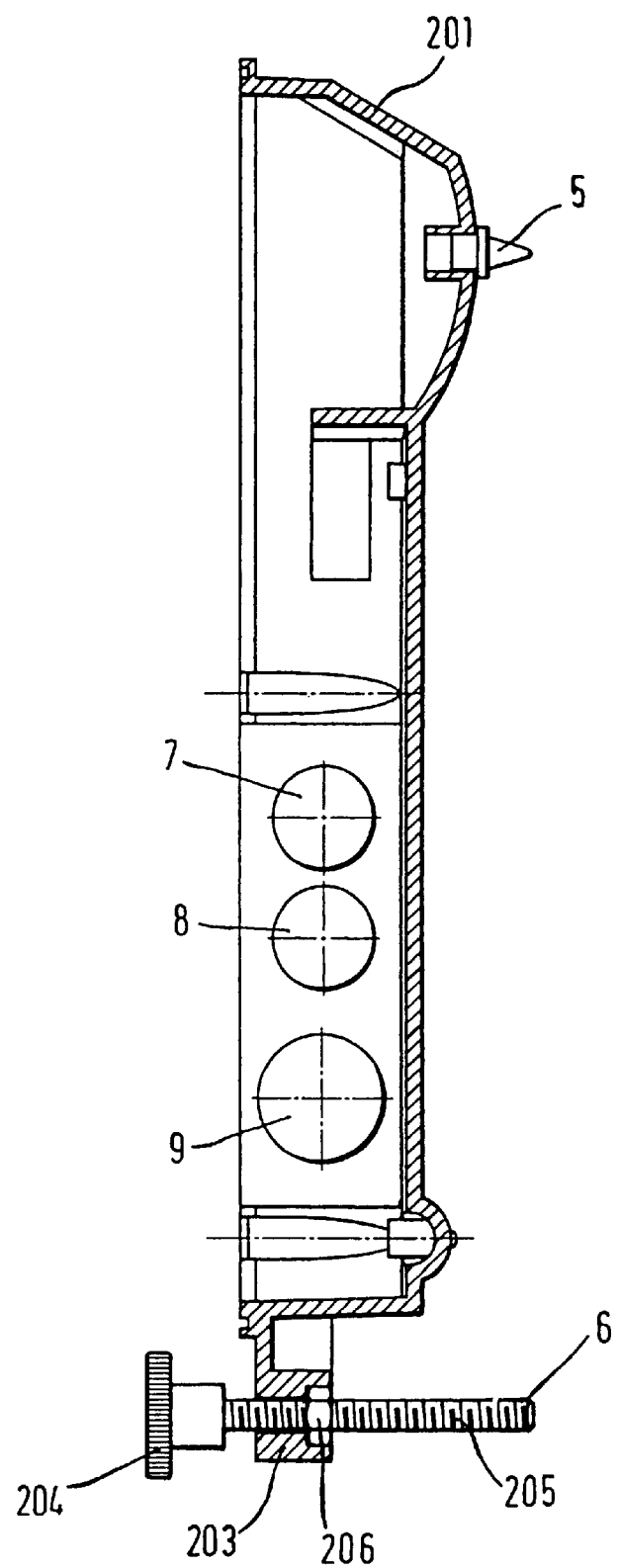
FIG. 3 is a sectional view of the bottom part of the housing taken along line III—III of FIG. 2.

FIG. 3 shows bottom part 201 of the housing in section, with stand base 6 and adjusting screw 204. Two other stand bases 5 are also provided on the front side (as seen in the direction of travel). Stand base 6 has an outside thread 205 which is in contact with an inside thread of threaded nut 206. Threaded nut 206 is fixedly arranged in receptacle 203.

Figure 4:
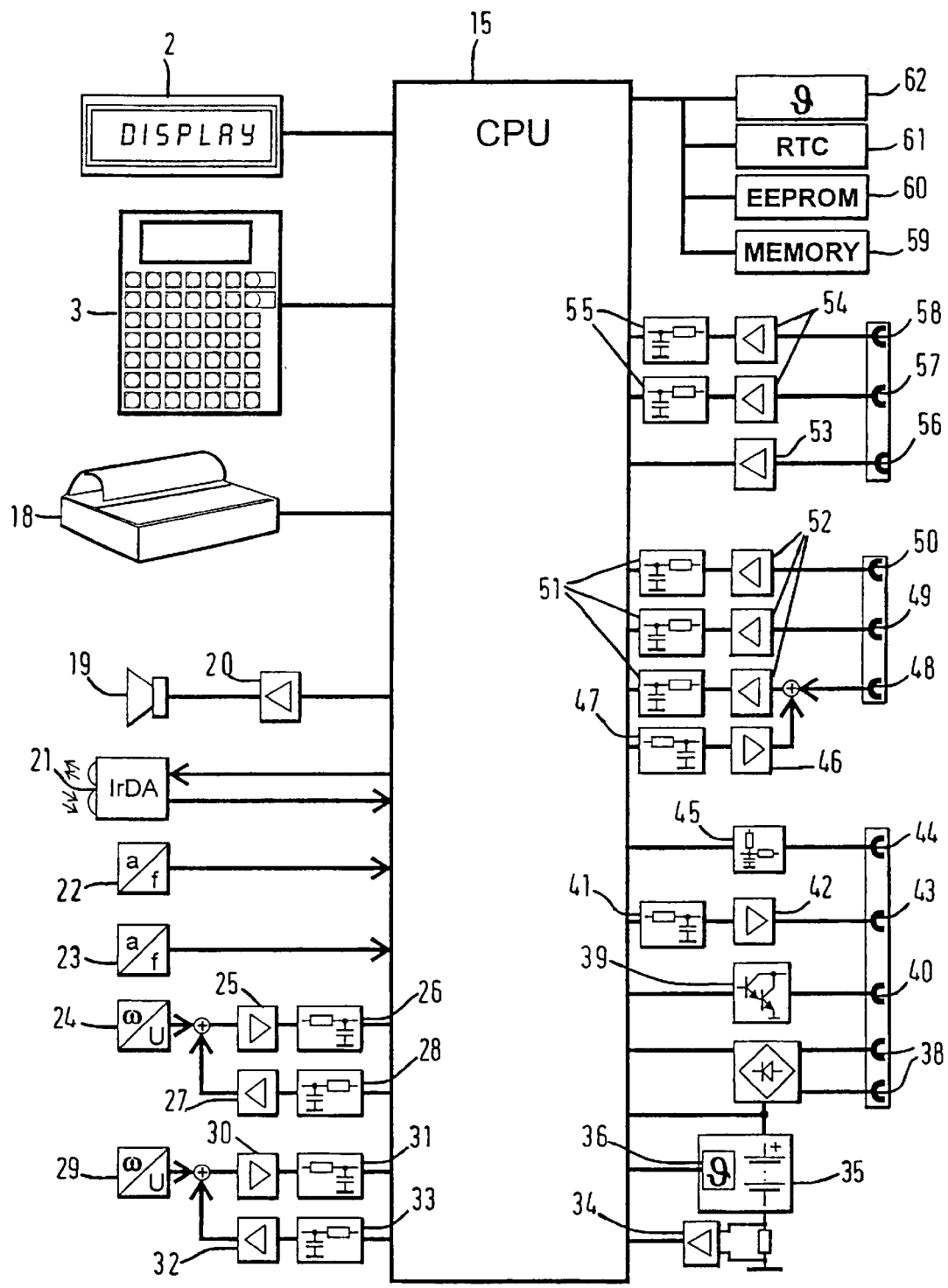
FIG. 4 is a simplified block diagram of the measuring device of the invention.

FIG. 4 shows a circuitboard that is the central processing unit (CPU) or control unit 15 to which are connected working memory 59, variable memory (EEPROM) 60, real-time clock 61 and temperature sensor 62. To display the measured values and for input by the operator, there are also display unit 2, input keyboard 3, printer 18, acoustic signal generator 19 and amplifier 20. A serial infrared interface 21 may also be used for communication and for storing the measured data. Battery 35 is charged via plug connector 38. The battery charge is monitored here by temperature sensor 36. The battery charging or discharging current is measured across a shunt resistor and connected to an amplifier 34. The charge status of battery 35 can be called up at any time on the basis of the integral of the battery current, even when the battery is being charged at the same time.

The acceleration sensors for longitudinal acceleration 22 and transverse acceleration 23 have frequency outputs, and the acceleration can be measured directly by way of processors without analog/digital converters.

Angle sensors 24 and 29 (pitch angle sensor 24 and roll angle sensor 29) deliver a signal that is proportional to the angular velocity. Since these signals have a great drift, the offset voltages are compensated by the analog outputs through the two filters 28, 33 and the amplifiers 27, 32. The resulting offset-free sensor signal is amplified 25, 30 and sent to the analog/digital converter of the controller by way of filters 26, 31.

An ink mark generator and an air valve 76 (FIG. 9) can be connected by power driver 39 in plug connector 40. Ink signals can be "shot" onto the road surface by the ink mark generator. The air valve is used to brake the trailer separately in the case of tractor trailer rigs (FIG. 9), so that the deceleration of the trailer can be determined by measurements on the tractor and the trailer.

A manual pushbutton 78 (FIG. 9) for starting the measurement manually can be connected by plug connector 44 and filter 45.

An analog output available in connection 43 is controlled by the pulse width modulator of the controller by way of filter 41 and amplifier 42. It serves to output measured values, for example, of pedal force, to analog displays.

Pneumatic compressed air sensors 72, 73, 74 (FIG. 9) can be connected at inputs 50, 57, 58 and measured by way of amplifiers 52 and 54 and filters 51 and 55.

Input 48 is designed so that a trailer hitch force sensor 71 can be connected. Since both positive and negative forces can occur on a trailer hitch force sensor, the zero point of input 48 can be set through filter 47 and amplifier 46.

The signal from the vehicle tachograph or the pulse generator for vehicle tachograph 75 is connected to the device at plug connector 56 and sent to the controller via amplifier and the Schmitt trigger 53.

Connection 49 is for connecting a pedal force meter with which the operating force of the brake pedal or the hand brake is measured.

Figure 9:
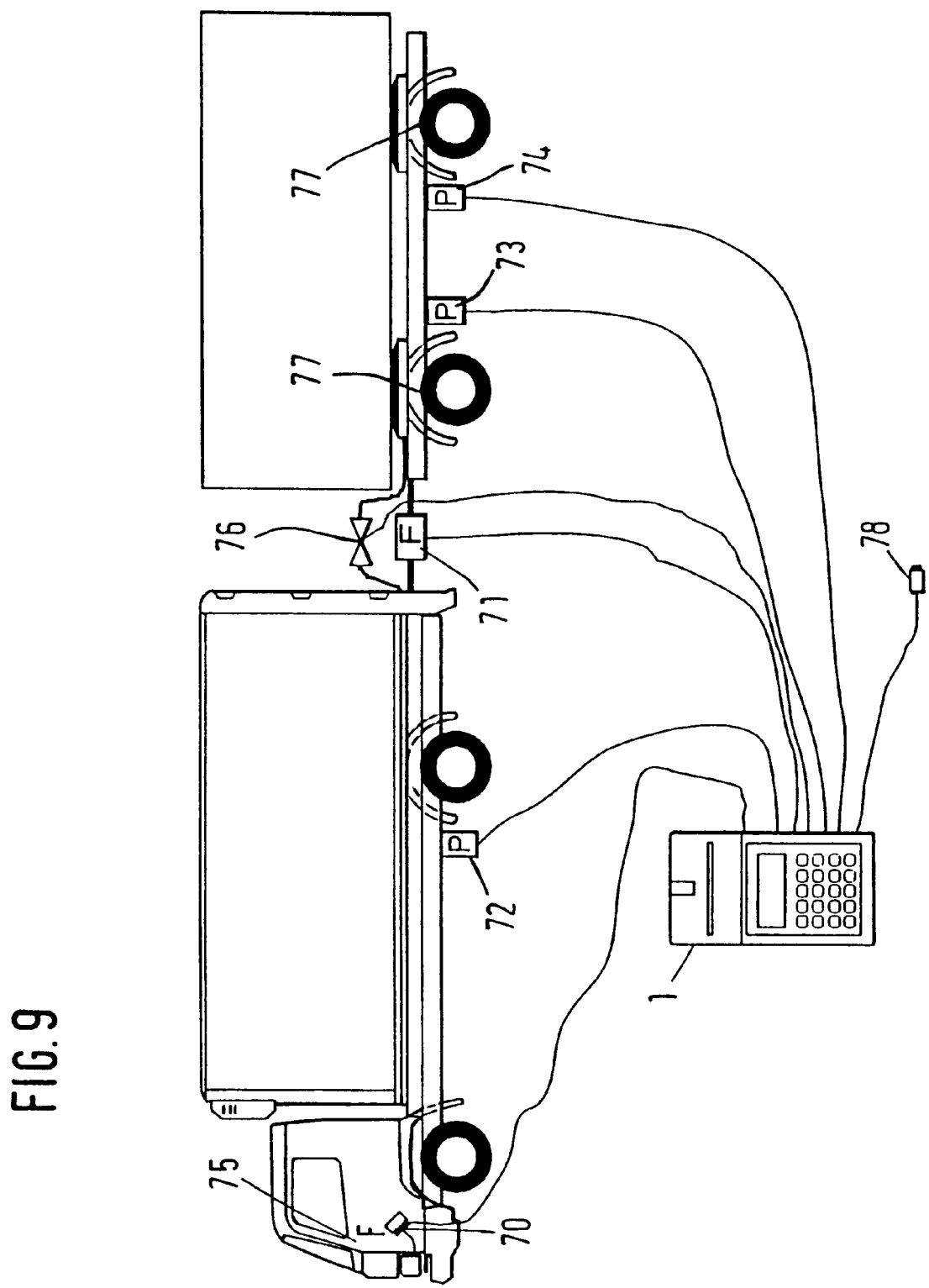
FIG. 9 shows how the measuring device of the invention is used for a truck.

FIG. 9 shows the measuring device with the various sensors on a truck. Control pressures can be measured by pressure sensors 72, 73, 74. Pedal force meter 70 is shown here on the brake pedal, where it measures the force between the foot and the brake pedal. To be able to determine the braking deceleration for the tractor and trailer separately, trailer hitch force sensor 71 is connected between the tractor and the trailer. Therefore, the compressed air brake system of trailer 77 is acted upon through valve 76. The trailer braking is calculated from the trailer hitch force.

The distance signal is picked up from the test connection of tachograph 75 and can be used to measure the vehicle braking deceleration as an alternative.

As already mentioned in the preamble, long braking distances and times are obtained in some cases in deceleration tests at high speeds with relatively low deceleration values. Since inexpensive angle sensors (not fully cardanic) yield only a change in angle, this angle change must be integrated to obtain the angle $\phi$. Therefore, even minor offset errors with the sensor can lead to a considerable angle error after integration. The following procedure is used to compensate for the offset error.

The braking test can be stored online in a memory in the device. After the measurement, a starting or stopping point (beginning/end) is defined. Then the zero point of the angle sensor can be set so that the angle integral (all angles in the entire measurement time) is zero.

Figures 6, 7, 8:
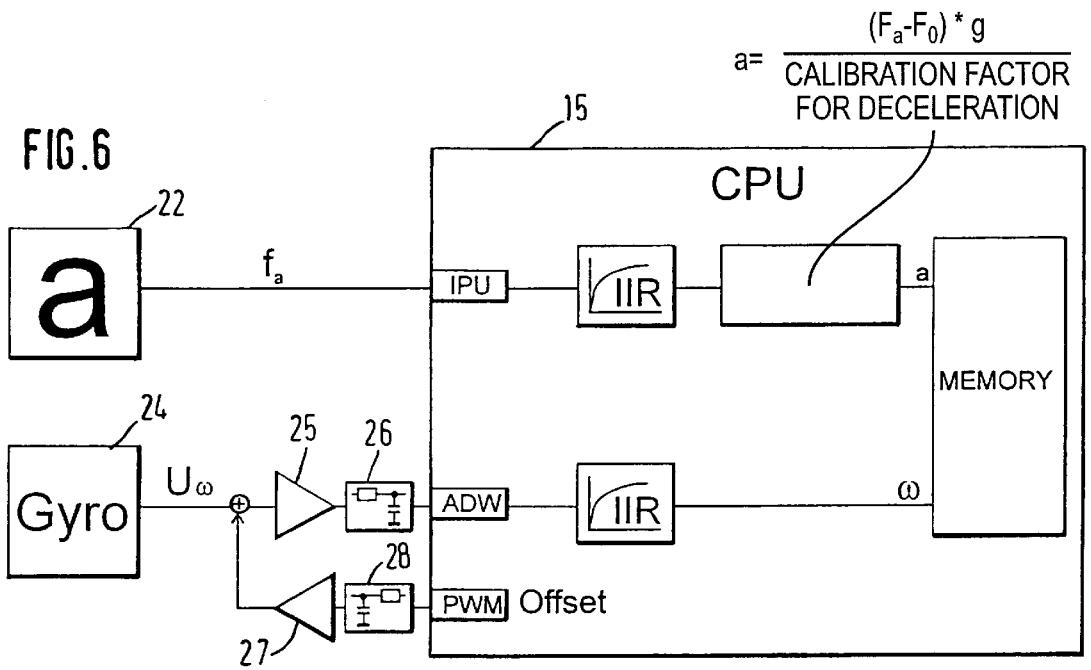
FIG. 6 shows interaction between the gyro sensor and the angle sensor of the invention.
FIG. 7 is an equation for angle determination.
FIG. 8 is a determination of deceleration equation.

FIG. 6 illustrates the relationships required for this. The acceleration a (22) and the angular velocity $U_\omega$ are entered into a memory in parallel through filters. The filters compensate for the differences in transit time of the deceleration sensor and the pitch angle sensor so that the two signals are again in phase. The zero point of the inclination sensor is adjusted by a pulse width modulator PWM. The pitching and rolling angle are determined by the integral of the angular velocity, as shown by the equation in FIG. 7. This procedure is used similarly for the transverse acceleration sensor.

In FIG. 8 the measured braking deceleration is corrected on the basis of the pitch angle $\phi$ thus determined.

Figure 5:
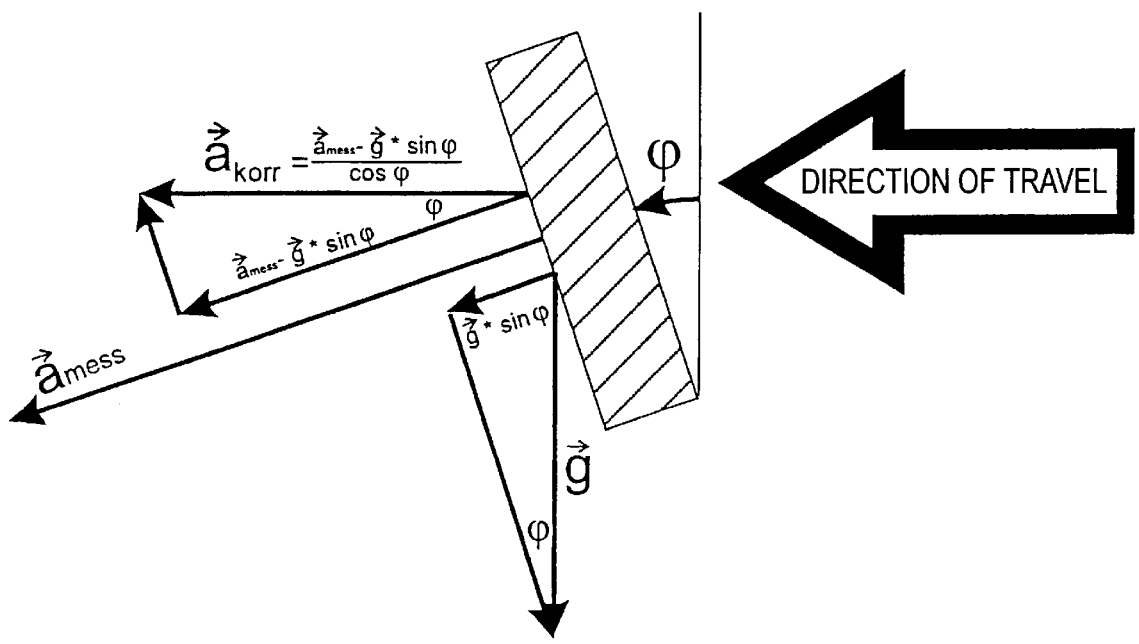
FIG. 5 shows a determination of the corrected braking deceleration $a_{korr}$ according to the invention.

In FIG. 5 this relationship is explained in a graphic plot, where $a_{mess}$ is the quantity measured by the acceleration sensor, composed of the real braking deceleration and the acceleration component due to gravity. Then the acceleration component due to gravity in the measurement signal is calculated from the angle $\phi$ calculated as described above using $g \cdot \sin(\phi)$, and this is then subtracted from the measured acceleration. Accordingly, the measured acceleration is corrected by $\cos(\phi)$ to obtain the acceleration acting in the direction of travel.

FIG. 5 shows the details of the relationships for the corrected braking deceleration $a_{korr}$ which is calculated from the measured deceleration $a_{mess}$.

FIG. 6 illustrates the relationships between acceleration and a gyro sensor or angle sensor.

FIG. 7 shows the equations for the angle calculation, where the pitch angle $\phi$ is calculated by integration of the angular velocity $\omega$. To do so, a quantity $\omega_0$ is calculated from the accumulated measured values and used to correct the measured angular velocity $\omega_1$.

FIG. 8 shows how the corrected acceleration is calculated with the angle $\phi$ thus determined.

Figure 10:
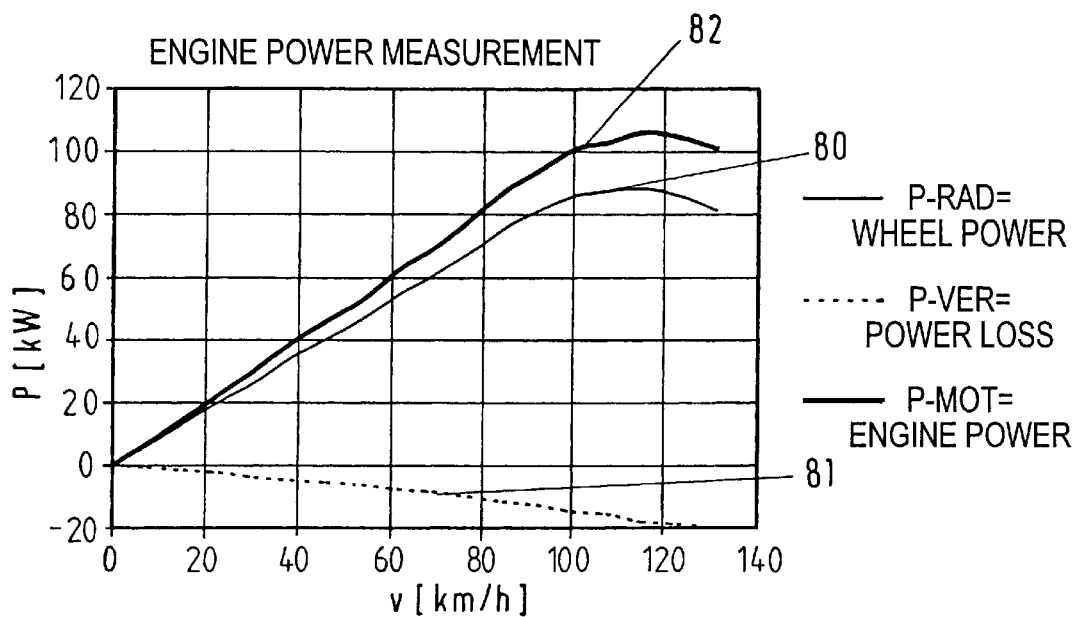
FIG. 10 shows a measurement chart for measurement of engine power.

FIG. 10 shows the diagram or the measurement chart of an engine power measurement, where curve 80 is the acceleration power of the vehicle, with power loss 81 being plotted after reaching the maximum speed and decoupling the engine. One power is subtracted from the other, yielding a power curve 82 which is greater by the amount of the power loss.

Figure 11:
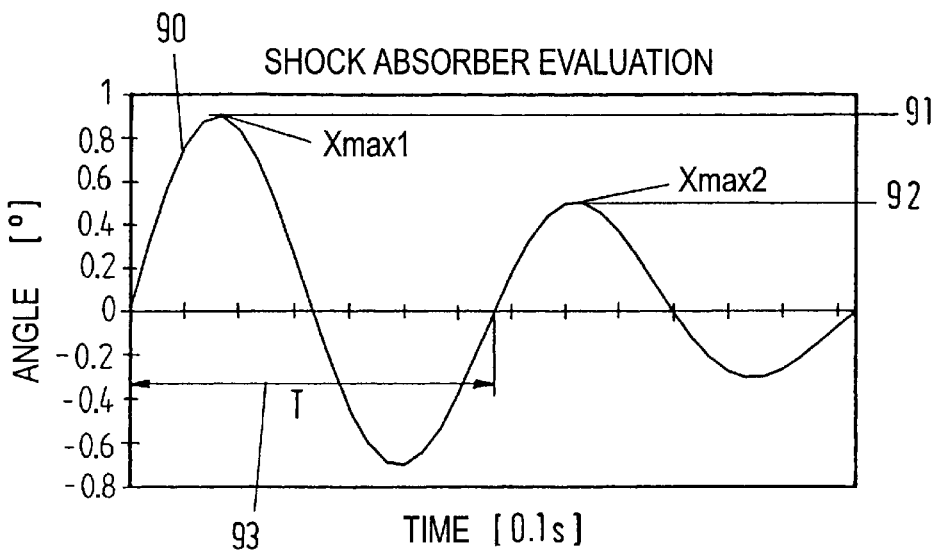
FIG. 11 shows a measurement chart for evaluation of a shock absorber.

FIG. 11 shows another test measurement chart, where the set of curves 90 represents the body vibration range, and the extent of damping by the shock absorber is formed from the logarithmic ratio of amplitudes 91 and 92. The damping factor can be determined by the period 93.

Figure 12:
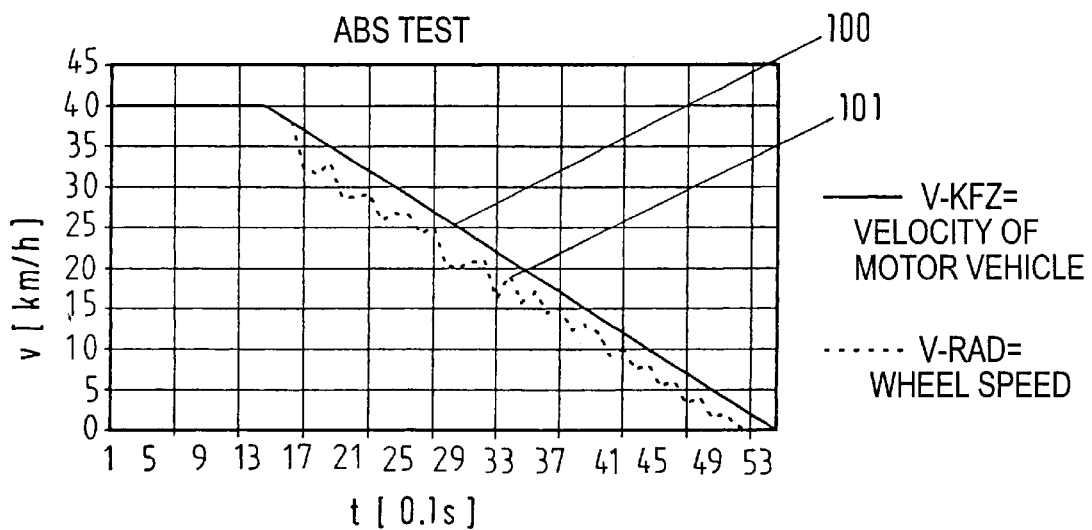
FIG. 12 shows a measurement chart for testing anti-lock brakes.

FIG. 12 shows a measurement chart, illustrating the testing of a vehicle equipped with an anti-lock brake system. Deceleration curve 100 here is represented by the compensated acceleration signal. Curve 101 corresponds to a wheel speed which is determined by a sensor mounted in the vehicle wheel (not shown here). This process can take place for one wheel or multiple wheels at the same time, or the individual vehicle wheels can be measured in individual driving tests.

Figure 13:
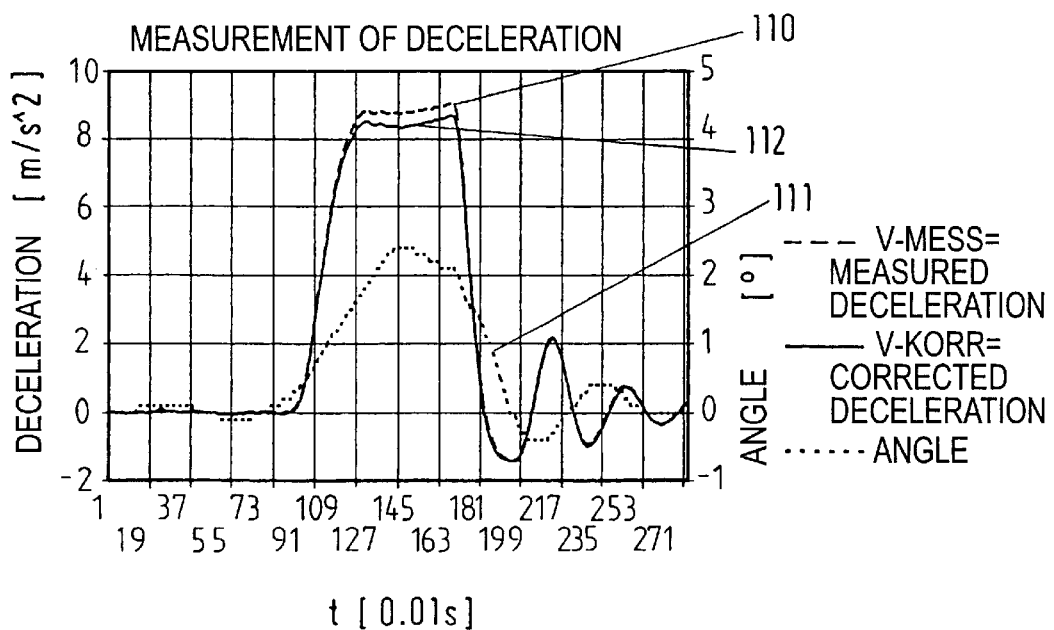
FIG. 13 shows a measurement chart for measuring deceleration.

FIG. 13 shows a measurement of braking deceleration on a motor vehicle, with the uncorrected acceleration signal $a_{mess}$ being represented in set of curves 110. Set of curves 111 show the pitch angle of the body (angle $\phi$). The actual braking deceleration 112 is the real deceleration of the motor vehicle corrected according to this invention.

It should be pointed out here that all parts and functions mentioned above may be used alone or in any combination. In addition, this invention is not limited to the application shown here, but instead it may be used for any moving objects.

In view of the above description it is likely that modifications and improvements will occur to those skilled in the relevant technical field which are within the scope of the accompanying claims. The invention is to be limited only by the appended claims, considering their spirit and scope, and equivalents.

What is claimed is:

1. A measuring device for vehicles, in particular for motor vehicles, the device comprising:
   a housing having a keyboard for interfacing with the device and a display unit; and
   a control unit arranged in the housing to receive measured values from at least one external sensor and for analyzing the measured values,
   wherein a negative acceleration of a vehicle is measured by an acceleration sensor, wherein an acceleration component is supplied by said acceleration sensor, wherein error in said acceleration component is modified by means of a separate angle sensor for measuring the pitching or rolling angle change of the vehicle during the negative acceleration and wherein said error occurs due to influences of acceleration due to gravity.

2. The measuring device according to claim 1, wherein the angle sensor is integrated into the measuring device, and an angle signal $\phi$ output by the angle sensor is compensated by placing marks at a beginning and end of a braking operation, and an integral of the angle signal is=0.

3. The method of claim 2, wherein different signal transit times of the sensors are compensated with different transit times of said filters.

4. The measuring device according to claim 2, wherein the acceleration and angle sensors have filters with the same lag times.

5. The measuring device according to claim 1, 2 or 3, wherein transverse acceleration is measured by a transverse acceleration sensor and pitching and rolling motion of the motor vehicle is compensated by an angle sensor arranged across the direction of travel.

6. The measuring device according to claims 2, or 3, wherein said vehicle comprises a tractor rig and a towed trailer, wherein a pedal force or a trailer hitch force between the tractor rig and the towed trailer as well as several brake operating pressures are detected by the device at the same time as the acceleration.

7. The measuring device according to claim 6, wherein the signal determined on the basis of a longitudinal acceleration sensor and the angle sensor arranged in the longitudinal direction is offset by the transverse acceleration sensor or the transverse angle sensor, or both so that a braking deceleration can be evaluated separately for the right and left sides of the vehicle.

8. The measuring device according to claim 1, wherein said vehicle comprises a tractor rig and a towed trailer, wherein for trucks with a tractor rig and a towed trailer attached with a hitch, first the deceleration of the tractor rig is determined, and then in a second test the deceleration of the tractor rig with the trailer is determined, and after separate input of a mass of the tractor rig and a mass of the trailer, the deceleration of the towed trailer is determined.

9. The measuring device according to claim 8, wherein the total deceleration is split into the deceleration of the tractor rig and the deceleration of the trailer on the basis of a force measured on the hitch with the trailer mass which is entered on a keyboard.

10. The measuring device according to one of claims 7 or 9, and further comprising a compressed air supply to the trailer which is decoupled by a valve in a braking test, where the braking operation thereby initiated through a spring loaded brake yields a certain deceleration of the tractor rig and trailer which in turn yields the trailer deceleration on the basis of the tractor and trailer masses which are entered separately on the keyboard.

11. The measuring device according to claim 1, wherein when the vehicle's brakes are applied, vehicle speed is calculated by integration of a determined deceleration, and a breaking distance is a calculated by performing integration again.

12. The measuring device according to claim 1 or 11, and further comprising a tachograph with a calibrated tacograph output signal, wherein to measure vehicle speed, an input signal of the tachograph is used, and to adjust actual speed, a tachograph constant is entered on the keyboard, with the acceleration being determined by differentiation from real vehicle speed thus derived.

13. The measuring device according to claim 12, wherein the calibrated tachograph output signal is used as a speed signal and is differentiated to determine the acceleration.

14. The measuring device according to claim 5, wherein pedal pressure is detected, deceleration threshold variables represent the force on the trailer hitch, printing documentation on the measuring device is started and simultaneously activating an output by means of which a valve is connected to the trailer compressed air supply or to an ink mark generator.

15. The measuring device according to claim 1, wherein the display unit comprises a paper strip which documents the measured parameters in addition to an electronic memory, power is supplied by a battery or by an on-board power supply system, and the battery is charged during the measurement or during printing, with instantaneous charge status being determined by a built-in current sensor by integration of battery current.

16. The measuring device according to claim 2, wherein a deflection and rebound of the vehicle are measured and recorded by sensors selected from the group consisting of a pitch angle sensor, a rolling angle sensor, a longitudinal acceleration sensor and a transverse acceleration sensor to test shock absorbers installed in the vehicle, and a shock absorber evaluation curve is output, with a measure of shock absorber performance being a reduction in amplitude from one vibration process to the next.

17. The measuring device according to claim 6, wherein a deflection and rebound of the vehicle are measured and recorded by sensors selected from the group consisting of a pitch angle sensor, a rolling angle sensor, a longitudinal acceleration sensor and a transverse acceleration sensor to test shock absorbers installed in the vehicle, and a shock absorber evaluation curve is output, with a measure of shock absorber performance being a reduction in amplitude from one vibration process to the next.

18. The measuring device according to claim 16, wherein the evaluation of the shock absorbers is performed directly during a braking test by considering the pitch angle relative to resulting acceleration (degrees per $m/s^2$), by calculating a pitch angle which is then divided by prevailing deceleration, thus yielding a relative pitch angle per unit of acceleration.

19. The measuring device according to claim 18, wherein transverse acceleration is measured in addition to the pitch angle during braking, thus yielding a separate evaluation of the shock absorbers of each side of the vehicle.

20. The measuring device according to claim 16 or 18, wherein the device is positioned centrally in the vehicle, preferably in a foot space thereof, and sequentially applies pressure downward and releases the pressure at each corner of the vehicle body with the angles thus determined being detected by the longitudinal and transverse angle sensors installed in the vehicle and converted to a percentage evaluation of the shock absorber effect per wheel.

21. The measuring device according to claim 1, wherein a vehicle tractive force, $F=m·a$, is calculated with acceleration values and input vehicle mass to determine power, and this tractive force value together with integrated acceleration values yields a drive power P-Rad=F·V.

22. The measuring device according to claim 21, wherein after measuring drive power, vehicle power loss is measured during deceleration with the vehicle in gear but with a clutch depressed, and then the drive power and vehicle power loss during deceleration with the clutch depressed are added to yield the total engine power curve P-Mot=P-Rad-P-Ver.

23. The measuring device according to claim 1, 2, 4 or 3, wherein the measurement is started manually through a push button.

24. The measuring device according to claim 1, 2, 4 or 3, wherein the measured values are output as analog values to measurement displays through the display unit.

25. The measuring device according to claim 1 or 11, wherein the vehicle has an anti-lock braking system, wherein at least one wheel speed is measured in addition to the vehicle body speed, which is determined by integration of the acceleration over the acceleration sensor, thereby evaluating efficacy of the anti-lock braking system.

26. The measuring device according to claim 12, wherein the vehicle has an anti-lock braking system, wherein at least one wheel speed is measured in addition to the vehicle body speed, which is determined by integration of the acceleration over the acceleration sensor, thereby evaluating efficacy of the anti-lock braking system.

27. The measuring device according to claim 1, wherein two stand bases of the housing are provided on one end of the housing due to the shape of a paper supply and a third stand base with an adjustable height is provided on an opposite end of the housing and serves to level the device using a built-in bubble level.

28. The measuring device according to claim 27, wherein the 3-base stand housing is arranged so that the two neighboring stand bases are toward the front of the vehicle in the direction of travel so that greatest possible stability is achieved during braking or deceleration in a curve in the roadway.

29. The measuring device according to claim 27 or 28, wherein a bubble level is built into a top part of the housing, so that the device can be leveled by means of an adjusting element located at the rear of the direction of travel of the vehicle.

30. A method of recording and analyzing measured acceleration values for vehicles, especially motor vehicles, comprising connecting a device to said vehicles, wherein said device comprises,
- a housing having a keyboard for interfacing with the device and a display unit; and
- a control unit receiving said measured values from at least one sensor arranged in a housing and analyzes said measured values,
- wherein an acceleration value of a vehicle is measured by an acceleration sensor, wherein an acceleration component is supplied by said acceleration sensor, wherein error in said acceleration component is modified by means of a separate angle sensor and wherein said error occurs due to influences of acceleration due to gravity.

* * * * *